US010334776B2

(12) United States Patent
Bouten et al.

(10) Patent No.: US 10,334,776 B2
(45) Date of Patent: Jul. 2, 2019

(54) METHOD AND SYSTEM HAVING AN INTERMEDIATE HOLDING VESSEL FOR COMBINING CHEMICAL INJECTION SUBSTANCES FOR A SPRAY SYSTEM

(71) Applicant: AGCO Corporation, Hesston, KS (US)

(72) Inventors: Petrus Henricus Johannes Bouten, Jackson, MN (US); Dean L Trask, Spirit Lake, IA (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/896,561

(22) PCT Filed: Jun. 9, 2014

(86) PCT No.: PCT/US2014/041499
§ 371 (c)(1),
(2) Date: Dec. 7, 2015

(87) PCT Pub. No.: WO2014/200896
PCT Pub. Date: Dec. 18, 2014

(65) Prior Publication Data
US 2016/0120118 A1    May 5, 2016

Related U.S. Application Data

(60) Provisional application No. 61/834,147, filed on Jun. 12, 2013.

(51) Int. Cl.
*A01M 7/00* (2006.01)
*A01C 23/04* (2006.01)
*B05C 17/005* (2006.01)

(52) U.S. Cl.
CPC ......... *A01C 23/042* (2013.01); *A01M 7/0092* (2013.01); *B05C 17/00553* (2013.01)

(58) Field of Classification Search
CPC .............. A01C 23/042; A01M 7/0092; B05C 17/00553
(Continued)

(56) References Cited

U.S. PATENT DOCUMENTS 3,976,087 A * 8/1976 Bolton ................ A01M 7/0092
137/15.01
4,121,767 A * 10/1978 Jensen ................ A01M 7/0092
137/92

(Continued)

FOREIGN PATENT DOCUMENTS

| GB | 2258413 A | 2/1993 |
|---|---|---|
| WO | 2008/051815 A2 | 5/2008 |
| WO | 2012/152758 A1 | 11/2012 |

OTHER PUBLICATIONS

European Patent Office, International Search Report for International Application No. PCT/US2014/041499, dated Sep. 24, 2014.

(Continued)

*Primary Examiner* — Jeremy Carroll

(57) ABSTRACT

A system includes a first tank containing water, a plurality of vessels, a second tank containing a mixed solution, a first conduit, a first pump, an injector associated with each of the vessels, a valve, a second conduit, and a second pump. Each of the plurality of vessels contains a substance. The mixed solution is formed from water from the first tank and a substance from at least one of the plurality of vessels. The first pump provides motive force for the water through the first conduit. An injector associated with each of the vessels controls release of the substance in that vessel into the first conduit. The valve prevents any of the substances and the mixed solution from entering the first tank. The second pump provides motive force for the mixed solution through the second conduit. A method of applying a mixed solution is also disclosed.

7 Claims, 2 Drawing Sheets

(58) Field of Classification Search
USPC .................................................. 222/145.6
See application file for complete search history.

(56) References Cited

U.S. PATENT DOCUMENTS

| | | | | |
|---|---|---|---|---|
| 4,714,196 A | * | 12/1987 | McEachern | B05B 9/06 239/127 |
| 4,768,712 A | * | 9/1988 | Terrell | A01C 23/042 137/624.12 |
| 4,867,192 A | * | 9/1989 | Terrell | A01C 23/042 137/624.11 |
| 5,203,504 A | * | 4/1993 | Frost | A01C 23/042 239/10 |
| 5,227,068 A | * | 7/1993 | Runyon | B01F 3/0473 210/143 |
| 6,079,633 A | * | 6/2000 | Inoue | B05B 17/0646 239/1 |
| 2006/0086296 A1 | * | 4/2006 | Wichmann | A01C 23/042 111/127 |
| 2013/0140376 A1 | | 6/2013 | Ballu | |

OTHER PUBLICATIONS

Peisl S et al: "Direkteinspeisung Von Pflanzenschutzmitteln", Landtechnik, Landwirtschaftsverlag, Munster, DE, vol. 47, No. 3, Mar. 1, 1992, pp. 116-117, XP000263502, ISSN: 0023-8082.

\* cited by examiner

METHOD AND SYSTEM HAVING AN INTERMEDIATE HOLDING VESSEL FOR COMBINING CHEMICAL INJECTION SUBSTANCES FOR A SPRAY SYSTEM

BACKGROUND

A crop sprayer is an agricultural application machine that breaks up a liquid into droplets that are blown or ejected into the air for distributed application to a wide area. Sprayers are typically used to apply liquid solutions such as herbicides, fungicides, pesticides, fertilizers, and other chemical treatments to agricultural crops. A typical crop sprayer includes a large volume tank carried on a chassis. Such a crop sprayer can be traded behind a tractor or provided as a self-propelled unit having an integral cab and engine to move across fields of crops. Some crop sprayers include an extending boom that provides a transverse line of uniformly spaced spray nozzles connected by pipes to the tank.

Generally, the chemical to be sprayed is held in a tank. The shape of the tank may be constrained by the need to easily clean its interior of residual chemicals. A large volume capacity is desirable to prevent the need to leave the field to replenish the supply of chemicals. Thus, conventional crop sprayer machines often sport large and cumbersome tanks, which may become contaminated with a chemical solution. Multiple rinse liquids may be required to clean the inside of the tanks.

One approach to address this problem is the use of a tank that holds only fresh water, rather than a chemical solution. A water tank does not need to be thoroughly cleaned inside; thus, it may possess a shape that allows the entire crop sprayer machine to have a more compact configuration. However, if the main tank solely is used for water, a chemical recirculation or recovery system is generally not possible. Thus, a machine equipped with chemical injection units typically also uses the main tank for a chemical spray mix and therefore becomes contaminated with a chemical solution.

SUMMARY

In one aspect, a system comprises a first tank containing water, a plurality of vessels, a second tank containing a mixed solution, a first conduit, a first pump, an injector associated with each of the vessels, a valve, a second conduit, and a second pump. Each of the plurality of vessels contains a substance. The mixed solution is formed from water from the first tank and a substance from at least one of the plurality of vessels. The first conduit fluidly connects the first tank, the plurality of vessels, and the second tank. The first pump provides motive force for the water through the first conduit. An injector associated with each of the vessels controls release of the substance in that vessel into the first conduit. The valve prevents any of the substances and the mixed solution from entering the first tank. The second conduit fluidly connects the second tank and the applicator. The second pump provides motive force for the mixed solution through the second conduit.

In a second aspect, a method of applying a mixed solution comprises forming a mixed solution, containing the mixed solution in a second tank, inhibiting back flow of the one or more substances and of the mixed solution into the first tank, and distributing the mixed solution to a plurality of applicators. The mixed solution is formed by mixing water from a first tank with one or more substances from a plurality of vessels, wherein each vessel contains one of the one or more substances.

This disclosure, in its various combinations, either in system or method form, may also be characterized by the following listing of items:

1. A System comprising:
   a first tank containing water;
   a plurality of vessels, each containing a substance;
   a second tank containing a mixed solution formed from water from the first tank and a substance from at least one of the plurality of vessels;
   a first conduit fluidly connecting the first tank, the plurality of vessels, and the second tank;
   a first pump that provides motive force for the water through the first conduit;
   an injector associated with each of the vessels, for release of the substance in that vessel into the first conduit;
   a valve that prevents any of the substances and the mixed solution from entering the first tank;
   an applicator;
   a second conduit fluidly connecting the second tank and the applicator; and
   a second pump that provides motive force for the mixed solution through the second conduit.
2. The system of item 1 wherein the applicator is a spray device.
3. The system of any of items 1-2 wherein at least one substance is in liquid form.
4. The system of any of items 1-3 wherein the second tank is smaller than the first tank.
5. The system of any of items 1-4 further comprising a computer controller that controls at least one of the first pump, injector, valve, applicator, or second pump.
6. The system of item 5 further comprising a user interface operationally connected to the controller.
7. The system of any of items 1-6 further comprising a third conduit fluidly connecting the applicator and the second tank.
8. The system of any of items 1-7 further comprising a mixer positioned along the first conduit between the plurality of vessels and the second tank.
9. The system of any of items 1-8 further comprising a meter for gauging a flow property in at least one of the first and second conduits.
10. The system of any of items 1-9 further comprising a manifold fluidly connected to the applicator.
11. The system of item 10 wherein the manifold is configured as a boom.
12. A method of applying a mixed solution, the method comprising:
    forming a mixed solution by mixing water from a first tank with one or more substances from a plurality of vessels, wherein each vessel contains one of the one or more substances;
    containing the mixed solution in a second tank;
    inhibiting back flow of the one or more substances and of the mixed solution into the first tank; and
    distributing the mixed solution to a plurality of applicators.
13. The method of item 12 further comprising spraying the mixed solution through at least one of the plurality of applicators.
14. The method of any of items 12-13 further comprising dissolving the at least one of the one or more substances in the water.

15. The method of any of items 12-14 further comprising using a computer controller to control at least one of forming a mixed solution, inhibiting back flow or distributing the mixed solution.
16. The method of any of items 12-15 further comprising moving the mixed solution along a first conduit that fluidly connects the first tank, the plurality of vessels, and the second tank.
17. The method of item 16 further comprising moving the mixed solution along a second conduit that fluidly connects the second tank and the plurality of applicators.
18. The method of item 17 further comprising recirculating the mixed solution along a third conduit that fluidly connects the plurality of applicators and the second tank.
19. The method of any of items 17-18 further comprising gauging a flow property in at least one of the first and second conduits.
20. The method of any of items 12-19 wherein the mixed solution is sprayed simultaneously from the plurality of applicators.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

Figure 1:
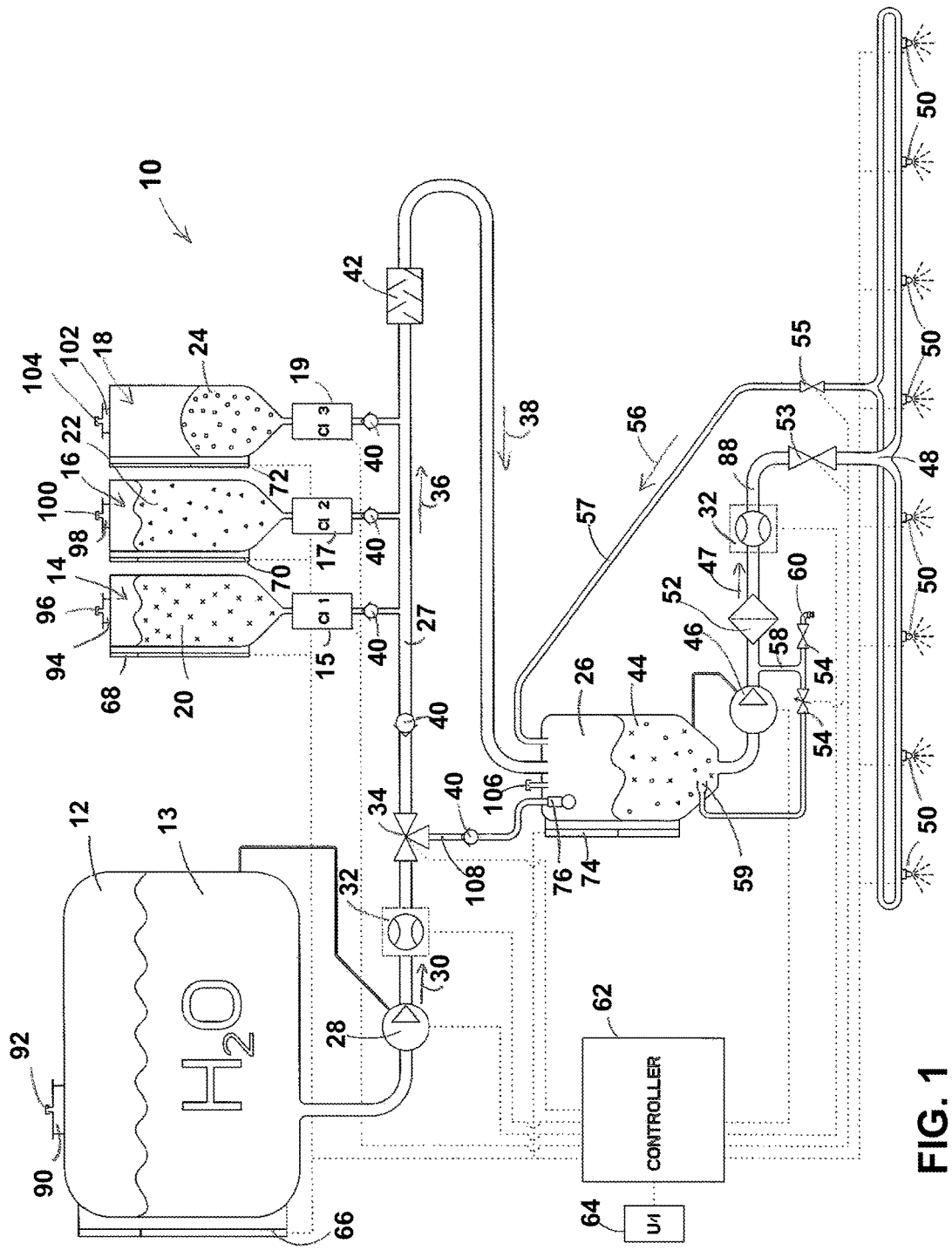
FIG. 1 is a schematic illustration of an exemplary embodiment of a system of the present disclosure.

FIG. 1 is a schematic illustration of an exemplary embodiment of a system of the present disclosure. In an exemplary embodiment, system 10 includes a first or main tank 12, which contains water 13 or a solution of water with other substances, such as, for example, an anti-foaming agent. However, main tank 12 is not intended to contain crop treatment chemicals.

In the illustrated embodiment, system 10 also includes chemical vessels 14, 16 and 18. While three chemical vessels are shown, it is to be understood that more or fewer chemical vessels may be used. In an exemplary embodiment, each chemical vessel 14, 16, 18 is a tank containing a substance 20, 22, 24, respectively, to be mixed with the water supplied from main tank 12 to form the solution to be sprayed onto crops. Substances 20, 22, 24 may be herbicides, fungicides, pesticides, or fertilizers, for example. In a particular spraying operation, one or more of the substances 20, 22, 24 can be used. Moreover, quantities and ratios of the utilized substances 20, 22, 24 can vary from one particular spraying operation to another. Quantities and ratios of the utilized substances 20, 22, 24 can even vary over the course of a single spraying operation, for example to treat different needs of different portions of a field. Each of the substances 20, 22, 24 can be provided in any physical form, though liquids are most common, followed by solid water-soluble particles such as powders or granules. In an exemplary embodiment, chemical vessels 14, 16, 18 are interchangeable and exchangeable. For example, each chemical vessel may be dedicated to a certain chemical substance. For a particular application, that substance may or may not be required. Moreover, another substance, not already represented by the present chemical vessels, may be desired. Thus, the chemical vessels may be exchanged for other chemical vessels so that system 10 includes the desired chemical substances for each application.

In an exemplary embodiment, a second or mixed solution tank 26 is positioned downstream of main tank 12 and chemical vessels 14, 16, 18. An exemplary method of use starts with an empty mixed solution tank 26, a main tank 12 containing water, and chemical vessels 14, 16, 18 each containing their respective substances 20, 22, 24. A first conduit 27 fluidly connects main tank 12, chemical vessels 14, 16, 18 and mixing tank 26. Transfer pump 28 provides the motive force to move water from main tank 12 through conduit 27 in the direction of path 30 through flow meter 32 and three-way valve 34. Flow meter 32 gauges one or more flow properties in conduit 27; such properties may include rate and pressure, for example. In another embodiment, three-way valve 34 is replaced by a two-way valve in conduit 27 and a two-way valve in conduit 108 leading from mixed solution tank 26 to conduit 27. The water continues along path 36 and path 38 of conduit 27 to mixed solution tank 26.

In an exemplary embodiment, each of main tank 12, chemical vessels 14, 16, 18 and mixed solution tank 26 is vented to the atmosphere. In the illustrated embodiment, main tank 12 includes lid 90 with vent 92; chemical vessel 14 includes lid 94 with vent 96; chemical vessel 16 includes lid 98 with vent 100; chemical vessel 18 includes lid 102 with vent 104; and mixed solution tank 26 includes vent 106. While no lid is shown for mixed solution tank 26, a lid may be provided therefor. In another embodiment, lids 90, 94, 98 and/or 102 may be provided without vents. Moreover, vents 92, 96, 100, and/or 104 may be associated with the respective tank or vessel without being positioned on a lid.

As needed to obtain a desired solution composition in mixed solution tank 26, one or more substances 20, 22, 24 is supplied to the first conduit 27. One-way check valves 40 prevent fluid or other substances from flowing backward into main tank 12 or chemical vessels 14, 16, 18. In an exemplary embodiment, at least one of valves 34 and 40 works alone or in combination to prevent the substances 20, 22, 24 and the mixed solution 44 from entering main tank 12. An optional mixer 42 may be used downstream of chemical vessels 14, 16, 18 to combine the water 13 from main tank 12 with the injected substances 20, 22, 24 into a homogeneous chemical solution. In some cases, mixer 42 is not used; the movement of the flowing fluids creates adequate turbulence to combine the water and injected substances. A chemical injector 15, 17, 19 is associated with each of the vessels 14, 16, 18, respectively, for release of the respective substance 20, 22, 24 in that vessel 14, 16, 18 into conduit 27. Chemical injectors 15, 17, 19 may utilize injection pumps, metering wheels, and other known devices for injecting, releasing, or otherwise disposing the desired amount of each respective substance 20, 22, 24 into conduit 27. Suitable commercially available chemical injectors include, for example, the "TeeJet Direct Chemical Injection System" from TeeJet Technologies of Wheaton, Ill., and the "Raven Sidekick Pro" from Raven Industries of Sioux Falls, S. Dak.

Flow meter 32 and gauges (not shown) corresponding to chemical vessels 14, 16, 18 allow an operator to monitor the flow of water 13 and injected substances 20, 22, 24 to form the desired chemical solution. If any of substances 20, 22, 24 is in solid form, it is preferably dissolved into water 13 before reaching mixed solution tank 26. When a level of mixed chemical solution 44 in mixed solution tank 26 reaches a certain "maximum" operating level, which may be predetermined or set, transfer pump 28 and the chemical injectors 15, 17, 19 may be turned off. Such actuation of pump 28 and the chemical injectors 15, 17, 19 may be manual but is preferably automated (e.g., via controller 62). Information from level sensors 66, 68, 70, 72, 74 can also be processed by controller 62 to alert an operator through user interface 64 if an amount of water 13 or substance 20, 22, 24 runs low so that the operator can replenish the corresponding main tank 12 or chemical vessel 14, 16, 18. Signal communication lines to and from controller 62 are shown in FIG. 1 in dotted lines. In the illustrated embodiment, controller 62 controls (i.e., receives input from and/or actuates) chemical injectors 15, 17, 19; transfer pump 28; flow meters 32; three-way valve 34; spray pump 46; two-way valves 53, 54 and 55; spray nozzles 50; user interface 64; and level sensors 66, 68, 70, 72, 74.

Mixed solution tank 26 supplies mixed chemical solution 44 for application to agricultural crops. In an exemplary embodiment, mixed chemical solution 44 is moved by spray pump 46 along path 47 of a second conduit 88 to manifold 48, which is fluidly connected to an applicator. In an exemplary embodiment, the applicator is a spray device. Flow meter 32 gauges one or more flow properties in conduit 88; such properties may include rate and pressure, for example. In the illustrated embodiment, manifold 48, which can be configured as a boom, distributes mixed chemical solution 44 to eight spray nozzles 50. In an exemplary embodiment, mixed chemical solution 44 is applied to a field from at least some of the spray nozzles 50 simultaneously. It is to be understood that more or fewer spray devices or nozzles may be used. In the illustrated embodiment, filter 52 and two-way valve 53 are positioned along conduit 88 to remove solid contaminates from mixed chemical solution 44 and control the flow of mixed chemical solution 44 between mixed solution tank 26 and manifold 48.

As the mixed chemical solution 44 is sprayed, the volume of mixed chemical solution 44 in mixed solution tank 26 decreases. In an exemplary system and method, feedback from level sensor 74 indicating a "minimum" level, which may be predetermined, causes controller 62 to automatically actuate the transfer pump 28 and chemical injectors 15, 17, 19. The flow of water 13 and substances 20, 22, 24 into mixed solution tank 26 continues in an exemplary embodiment until the volume of mixed solution tank reaches a predetermined "maximum" operating level (again, as detected by level sensor 74). To ensure that mixed chemical solution 44 in mixed solution tank 26 is not depleted during operation, in an exemplary embodiment, transfer pump 28 has a greater flow capacity than spray pump 46. Similarly, in an exemplary embodiment, main tank 12 has a greater volume capacity than mixed solution tank 26. Mixed chemical solution 44 is supplied from mixed solution tank 26 to manifold 48. In an exemplary embodiment, system 10 provides for recirculation through path 56 on a third conduit 57, which fluidly connects spray nozzles 50 to mixed solution tank 26. Any amount of mixed chemical solution 44 that is not used (i.e., not sprayed out of nozzles 50) is recirculated back through the booms, for example, and back to mixed solution tank 26 via path 56 on the third conduit 57. Use of recirculation may be desired in order to keep pressure and liquid available for fast spray turn-on times and to purge air out of the boom plumbing. Moreover, keeping the booms and plumbing full of moving fluid helps to prevent sediment from settling within the boom and plumbing lines and components.

In an exemplary method of use, an operator may instruct a computer controller 62 through user interface 64, which is operationally connected to controller 62. In some embodiments, software instructs controller 62. Thus, the operator or software can instruct controller 62 to control flow from main tank 12 and chemical vessels 14, 16, 18 to maintain a desired chemical solution composition and level in mixed solution tank 26. The particular chemical solution composition can change between uses or even during a single spray operation. In an example, a field may be digitally mapped so controller 62, in conjunction with a Global Positioning System (GPS), has information on what treatment certain areas of the field should receive, allowing controller 62 to make automatic adjustments, thereby relieving the operator from the task of making manual adjustments. If the operator or software determines that a first chemical solution mix is needed for a portion of the field and a second chemical solution mix is needed for another portion of the field, system 10 can be operated by controller 62 to change the relative flow rates or amounts coming from main tank 12 and/or chemical injectors 15, 17, 19 upon manual input, and/or after a certain volume of mixed chemical solution 44 has been used, and/or after a certain amount of spraying time has elapsed, and/or in response to another parameter or condition (including, for example, the physical location of the system in the field).

At some point, such as when the field is nearly completely sprayed, the operator and/or controller 62 may turn off transfer pump 28 and chemical injectors 15, 17, 19. In an exemplary embodiment, spraying from nozzles 50 continues until mixed solution tank 26 is nearly or entirely empty of mixed chemical solution 44. When spraying is completed, there are options for further use of system 10.

In one exemplary method, transfer pump 28 is turned on to provide water 13 from main tank 12 to flush all the lines, plumbing and pumps, including for example, conduits 27, 57, 88; manifold 48; and spray pump 46. The rinse water, containing residual chemicals, may be moved to mixed solution tank 26 through conduits 27 and 57. The rinse water can be drained through conduit 58 (via two-way valve 54) and drain 60 for disposal.

In another example, such as when another field is to be sprayed, the chemical injectors 15, 17, 19 may be used to supplement the rinse water in mixed solution tank 26 to thereby create a desired mixed chemical solution 44 in mixed solution tank 26. In this case, no chemicals are wasted; yet, a different mix of substances 20, 22 and 24 may be provided in the new batch of mixed chemical solution 44 as compared to the previous batch.

In yet another example, transfer pump 28 is turned on to provide water 13 from main tank 12 to flush all the lines, plumbing and pumps, including for example, conduits 27, 57, 88; manifold 48; and spray pump 46. The rinse water, containing residual chemicals, may be moved to mixed solution tank 26 through conduits 27 and 57. This diluted solution may then be sprayed from nozzles 50 until there is no more diluted solution. With such a so-called "blow out," the diluted chemicals are disposed of by spraying onto the field.

In yet another case, another fluid may be introduced (e.g., air) to displace remaining liquid from all the lines, plumbing and pumps, including for example, conduits 27, 57, 88; manifold 48; and spray pump 46. The chemical solution is thereby returned to mixed solution tank 26 through conduits 27 and 57. It may then be disposed of through drain 60.

In the illustrated embodiment of system 10, all chemical residue is contained downstream of three-way valve 34. Thus, main tank 12 and plumbing upstream of three-way valve 34 remains uncontaminated, thereby ensuring an abundant supply of fresh water 13 when needed. Moreover, because main tank 12 does not contain spray chemicals, its interior does not require thorough cleaning, thereby allowing for the omission of an agitation device 59 or rinse device 76, such as one shown in mixed solution tank 26. Additionally, because the interior of main tank 12 does not require thorough cleaning, main tank 12 may take on an irregular shape that allows its form to wedge into tight spaces while still possessing a high volume capacity.

While FIG. 1 illustrates one embodiment of system 10, it is to be understood that variations therefrom are contemplated, including other plumbing designs having different placements for pumps, valves, and other components. For example, while main tank 12 is depicted as a single large tank, it is contemplated that its role may be filled by a plurality of smaller irregularly shaped tanks, which may be fit more compactly onto a crop sprayer machine. Mixed solution tank 26 can be relatively small, as its supply of mixed chemical solution 44 can be replenished out in the field. Because mixed solution tank 26 can be relatively small and main tank(s) 12 can be irregularly shaped and wedged into tight spaces, a crop sprayer using system 10 might be much more compact than one with a conventional chemical system, while not sacrificing spraying capacity or effectiveness.

In an exemplary embodiment, a volume of main tank 12 or the sum of volumes of a plurality of main tanks is between about 600 gallons and about 2400 gallons. In an exemplary embodiment, a volume of each chemical vessel 14, 16, 18 is between about 20 gallons and about 40 gallons. In some cases, a volume of mixed solution tank 26 is about $1/10^{th}$ of the capacity of main tank 12. A relatively small mixed solution tank 26 is desirable because it allows for relatively quick changes in the chemical composition of mixed chemical solution 44. When changes to the control of chemical injectors 15, 17, 19 are made, it does not take long for the small amount of the previous formulation of mixed chemical solution 44 to be used before the new formulation fills the mixed solution tank 26. In an exemplary embodiment, spray pump 46 has a capacity of between about 75 gallons per minute and about 200 gallons per minute, and transfer pump 26 has a higher rate capacity than spray pump 46. This helps to ensure that mixed solution tank 26 does not run empty unintentionally. It is to be understood that other sizes and capacities of components may also be used. Simplified depictions of the concepts are illustrated; in practice, one may desire to add other sensors, controllers, or other components.

System 10 reduces chemical waste because a desired supply of chemical composition for field treatment can be mixed upon demand; if an initially mixed amount is not enough, more may be mixed out in the field. This is in contrast to the conventional practice, where operators are likely to take out to the field more mixed chemical solution than necessary because they have no means by which to mix more in the field, and it requires both time and effort to return from the field to obtain more chemical solution. Thus, in the conventional practice, it is not uncommon to have hundreds of liters of leftover mixed chemical solution, which must be removed from the tank for storage or disposal. Moreover, with system 10, the chemical make-up of mixed chemical solution 44 may be changed on site (e.g., literally, out in the field) without necessitating a return from the field to pick up another batch of chemicals. Such a change in the chemical composition or make-up may be accomplished by changing the relative flow rates of water 13 through transfer pump 28 and/or of substance(s) 20, 22, 24 through chemical injector(s) 15, 17, 19, for example. To illustrate the flexibility of this system, if the operator encounters an area of the field that has weeds, the operator or controller 62 may add a weed control substance from one of chemical vessels 14, 16, 18 just for spraying that particularly weedy area. When the operator is close to finishing spraying of the weedy area, the operator can stop injection of the weed control substance.

Figure 2:
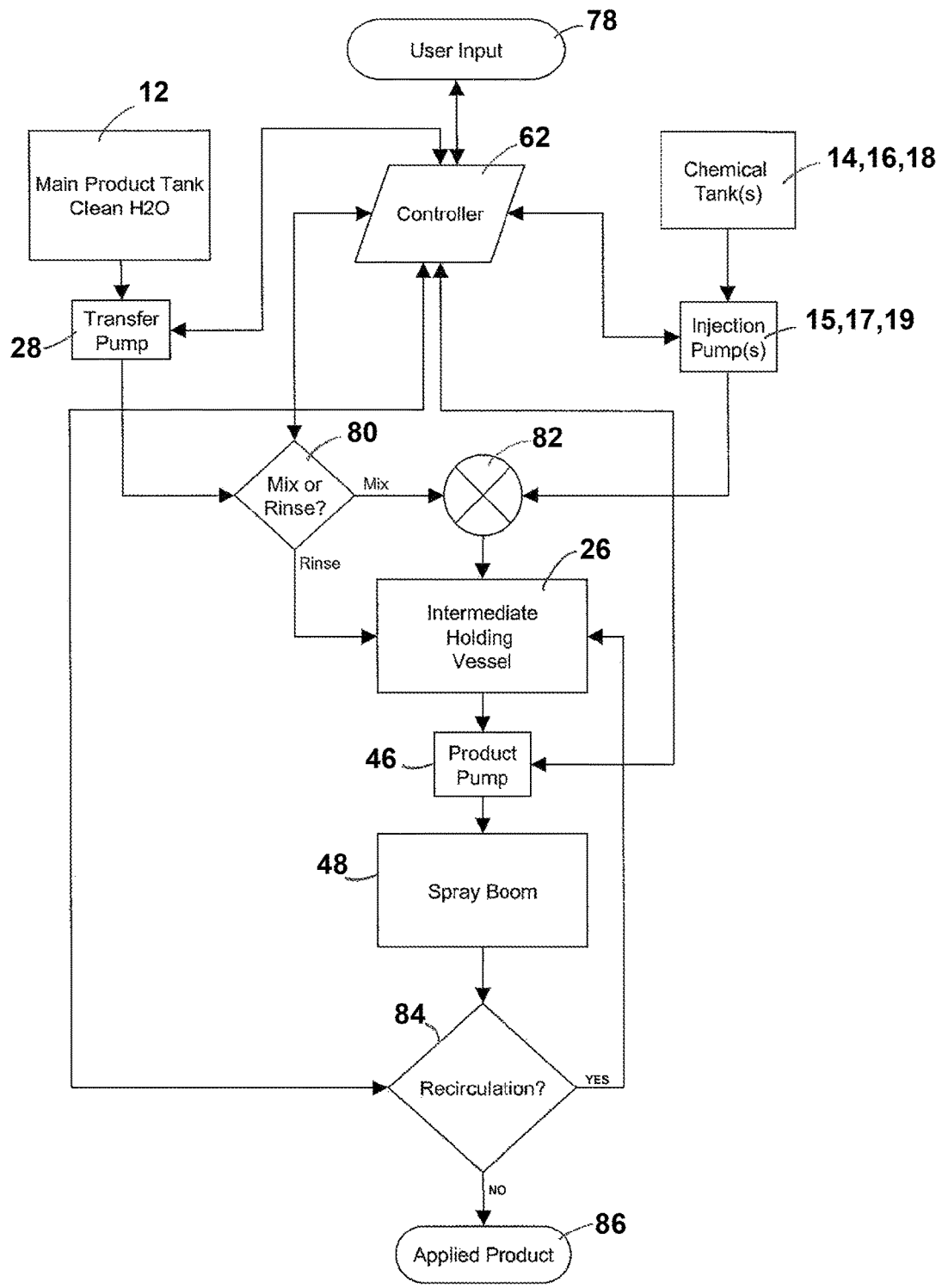
FIG. 2 is a flowchart of an exemplary embodiment of a method of the present disclosure.

FIG. 2 is a flowchart of an exemplary embodiment of a method followed by controller 62. User input 78 is provided to controller 62, such as through user interface 64. Moreover, some routines, settings, and parameters, for example, may be preset into controller 62, thus requiring less input from the operator. Controller 62 also provides feedback to the operator, including, for example, a level of water 13 or substances 20, 22, 24, or whether there is an imminent need for their replenishment, and a level of chemical solution 44. Controller 62 receives input from and actuates transfer pump 28 and chemical injection pumps 15, 17, 19.

At block 80, a determination is made regarding whether it is desirable to mix water 13 and one or more substances 20, 22, 24 to form mixed chemical solution 44, or whether it is desirable to rinse mixed solution tank 26 with only water 13. The decision is communicated to controller 62. If "mix" is chosen, it occurs at step 82. The mixing may happen at mixer 42 positioned along conduit 27 and/or may happen along conduit 27 as substances 20, 22 and/or 24 are introduced by chemical injectors 15, 17, 19 into the water flowing therein. If "rinse" is chosen, then water 13 is pumped to mixed solution tank 26 without the introduction of substances 20, 22 and/or 24. Controller 62 actuates (and receives feedback from) spray pump 46 to send mixed chemical solution 44 from mixed solution tank 26 to manifold 48, such as one connected to a spray boom.

At block 84, a determination is made regarding whether it is desirable to recirculate the mixed chemical solution 44 and communicated to controller 62. If "yes," then controller 62 operates valve 55 to allow the mixed chemical solution 44 to travel on recirculation path 56 of conduit 57 back to mixed solution tank 26. If "no," then the mixed chemical solution 44 is sprayed out of nozzles 50 for application to the field, resulting in applied product 86.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa. While the concepts have been described with reference to an agricultural crop sprayer, it is contemplated that they may be applied to any spraying system in which water is mixed with other chemicals to form a treatment product. For example, the described concepts may be applied to a plane de-icing spray system or landscaping spray system.

What is claimed is:

1. An agricultural spraying system for use in applying at least one substance to a field, the agricultural spraying system comprising:
   a main tank containing water;
   a plurality of vessels, each containing a substance;
   a mixed solution tank containing a mixed solution formed from water from the main tank and a substance from at least one of the plurality of vessels;
   a first conduit fluidly connecting the main tank, the plurality of vessels, and the mixed solution tank;
   a transfer pump that provides motive force for the water through the first conduit;
   an injector associated with each of the vessels, for release of the substance in that vessel into the first conduit;
   a mixer positioned along the first conduit between the plurality of vessels and the mixed solution tank configured to mix the water from the main tank and the substance from the at least one of the plurality of vessels prior to reaching the mixed solution tank;
   a valve that prevents any of the substances and the mixed solution from entering the main tank;
   a boom manifold having an inlet and an outlet with a plurality of applicator spray nozzles positioned between the inlet and outlet that are configured to dispense the mixed solution;
   a second conduit fluidly connecting the mixed solution tank and the inlet of the boom manifold;
   a spray pump located in the second conduit that provides motive force for the mixed solution through the second conduit, wherein the transfer pump has a greater flow capacity than a flow capacity of the spray pump; and
   a third conduit fluidly connecting the outlet of the boom manifold and the mixed solution tank, wherein mixed solution supplied through the second conduit by the spray pump that is not dispensed by the applicator spray nozzles is returned to the mixed solution tank through the third conduit.

2. The system of claim 1 wherein at least one substance is in liquid form.

3. The system of claim 1 wherein the mixed solution tank is smaller than the main tank.

4. The system of claim 1 further comprising a computer controller that controls at least one of the transfer pump, injector, valve, applicator, or spray pump.

5. The system of claim 4 further comprising a user interface operationally connected to the controller.

6. The system of claim 1 further comprising a meter for gauging a flow property in at least one of the first and second conduits.

7. The system of claim 4 further comprising a level sensor configured to detect a level in the mixed solution tank, wherein the controller actuates the transfer pump and at least one injector when the level reaches a predetermined minimum level.

* * * * *